(12) United States Patent
Uchida (10) Patent No.: US 7,330,572 B2
(45) Date of Patent: Feb. 12, 2008

(54) FINGERPRINT AUTHENTICATION METHOD, PROGRAM AND DEVICE CAPABLE OF JUDGING INEXPENSIVELY WHETHER INPUT IMAGE IS PROPER OR NOT

(75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 788 days.

(21) Appl. No.: 10/672,550

(22) Filed: Sep. 26, 2003

(65) Prior Publication Data

US 2004/0062425 A1 Apr. 1, 2004

(30) Foreign Application Priority Data

Sep. 27, 2002 (JP) ............................. 2002-283309

(51) Int. Cl.
*G06K 9/00* (2006.01)
(52) U.S. Cl. ...................................... 382/124
(58) Field of Classification Search ............... None
See application file for complete search history.

(56) References Cited

U.S. PATENT DOCUMENTS

| | | | |
|---|---|---|---|
| 4,225,850 A | | 9/1980 | Chang et al. |
| 6,067,369 A | * | 5/2000 | Kamei ......................... 382/125 |
| 6,094,499 A | * | 7/2000 | Nakajima et al. ............. 382/124 |
| 6,330,347 B1 | * | 12/2001 | Vajna .......................... 382/125 |
| 6,782,120 B2 | * | 8/2004 | Modl et al. ................... 382/124 |
| 2001/0040987 A1 | * | 11/2001 | Bjorn et al. .................. 382/124 |

FOREIGN PATENT DOCUMENTS

| | | |
|---|---|---|
| DE | 4220971 A1 | 1/1993 |
| DE | 19929671 A1 | 1/2001 |
| EP | 0 736836 A2 | 10/1996 |
| JP | 56-24675 | 3/1981 |
| JP | 4-33065 | 2/1992 |
| JP | 8-110949 | 4/1996 |

(Continued)

OTHER PUBLICATIONS

D. M. Weber, "A Cost Effective Fingerprint Verification Algorithm for Commercial Applications", Communications and Signal Processing, 1992, Comsig '92, Proceedings of the 1992 South African Symposium on Cape Town, South Africa, Sep. 11, 1992, IEEE, pp. 99-104.

Primary Examiner—Matthew C. Bella
Assistant Examiner—Alex Liew
(74) Attorney, Agent, or Firm—Scully, Scott, Murphy & Presser, P.C.

(57) ABSTRACT

A fingerprint authentication device comprises input finger characteristic judging portion 13. The input finger characteristic judging portion 13 judges whether the input data is proper or not on the basis of spatial frequency analysis of an fingerprint image represented by the input data. An observation area deciding portion decides an observation area on the fingerprint image. A frequency analyzing portion 132 transforms image of the observation area into a Fourier transformed image. The frequency analyzing portion 132 further calculates averages and dispersion of strength values corresponding to predetermined spatial frequency bands. A discriminative value calculating portion calculates discriminative values by the use of the averages and the dispersion. A deciding portion decides whether the input image is proper or not by the use of the discriminative values together with discriminative coefficient preliminary calculated.

21 Claims, 6 Drawing Sheets

FOREIGN PATENT DOCUMENTS

| | | |
|---|---|---|
| JP | H08-129644 | 5/1996 |
| JP | 8-161491 | 6/1996 |
| JP | 9-274656 | 10/1997 |
| JP | 2776757 | 5/1998 |
| JP | H10-177650 | 6/1998 |
| JP | 3150126 | 1/2001 |
| JP | 2001-266133 | 9/2001 |
| JP | 2002-133417 | 5/2002 |
| WO | WO 01/24700 A1 | 4/2001 |

\* cited by examiner

FINGERPRINT AUTHENTICATION METHOD, PROGRAM AND DEVICE CAPABLE OF JUDGING INEXPENSIVELY WHETHER INPUT IMAGE IS PROPER OR NOT

This application claims priority to prior application JP 2002-283309, the disclosure of which is incorporated herein by reference.

BACKGROUND OF THE INVENTION

This invention relates to fingerprint authentication method, program and device.

The fingerprint is a pattern of distinctive epidermal ridges on the bulbs of the inside of the end joints of fingers and thumbs. The fingerprint has uniqueness and immutability. Even if the fingerprint in damaged, undamaged corium under the damaged fingerprint ensures that the fingerprint is regenerated. Therefore, the fingerprint can be used to identify each individual person with a high accuracy.

A fingerprint authentication device is used in a security system for various machines and systems. For instance, the fingerprint authentication device allows a regular or normal user, who is previously enrolled in a computer or an information service system using a computer network, to login the computer or to receive information services from the information service system through the computer network. The fingerprint authentication device uses a fingerprint image provided by a user who intends to login the computer or to receive the information services from the computer network to judge whether the user is a registrant (or the regular user) r not.

A related fingerprint authentication device essentially comprises:

(1) a fingerprint sensor (or a fingerprint input portion) for receiving the fingerprint image provided by the user into this system;

(2) a feature extracting portion for processing input data to extract features of the fingerprint image which are used for collation;

(3) a database for memorizing enrolled data (or template (s)), which are previously produced, about the regular user (s); and (4) a collating and judging portion for comparing (features of) the input data with (features of) the enrolled data to judge whether the user is the registrant. Such a fingerprint authentication device is disclosed in Unexamined Japanese Patent Publication No. Hei 4-33065.

When there is certain degree of similarity between the features of the input data and the features of the enrolled data, the fingerprint authentication device identifies the user who provided the fingerprint image as the enrolled normal user and allows the user to perform a predetermined operation, such as login a computer.

The fingerprint input portion converts a ridge pattern, which is based on minute concavities (or grooves between ridges) and convexities (or ridges) of a surface of an object (i.e. a finger) placed on the fingerprint sensor, into a digital image data (as the input data). In many cases, the fingerprint input portion includes an optical system. As the optical system, it is known that a method obtains a high contrast image by means of total reflection of a prism. For the method, a photo acceptance device such as a CCD receives light emitted by an LED light source and reflected at an inner side of a reflecting surface of the prism. When a finger of the user is put on an outer side of the reflecting surface of the prism, the concavities and the convexities thereof change reflectance of the reflecting surface. Thus, the photo acceptance device produces the digital image data according to the concavities and the convexities of the finger put on the prism.

In another optical system, light is applied to the finger put on the fingerprint sensor from light sources placed in the vicinity of the fingerprint sensor. The light is scattered at the inside of the finger and a part thereof reaches the fingerprint sensor. The light received by the fingerprint sensor includes difference of strength according to the ridges and grooves of the fingerprint. The fingerprint sensor produces the digital image data on the basis of the strength of the light, Such an optical system is disclosed in Japanese Patent Publication No. 3150126 (P3150126).

The feature extracting portion extracts the features of the fingerprint image represented by the digital image data to collate with features represented by the enrolled data. The enrolled data is also produced by the feature extracting portion previously and memorized in the database.

The collating and judging portion calculates degree of similarity between the features based on the input data and the features based on the enrolled data. Furthermore, the collating and judging portion compares the calculated degree of the similarity with a threshold value. When the calculated degree is larger than or equal to the threshold value, the collating and judging portion judges that the input data and the enrolled data have a common origin. That is, an authentication request is accepted by the fingerprint authentication device. On the other hand, when the calculated degree is smaller than the threshold value, the collating and judging portion judges that the input data and the enrolled data have different origins. That is, the authentication request is rejected by the fingerprint authentication device.

Incidentally, the reason why the authentication request is rejected by the fingerprint authentication device is not clear for the user. The fingerprint authentication device does not accept the authentication request not only when the user is unregistered but also when input of the fingerprint is improper. In other words, when the input data is inappropriate for the authentication, the fingerprint authentication device denies the authentication. Accordingly, an informing system is necessary to inform the user that the input of the fingerprint is improper.

The input of the fingerprint considerably depends on physical relationship between the finger of the user and the fingerprint sensor. There are some systems for deciding whether the physical relationship between the finger of the user and the sensor is correct or not. Such a system is disclosed in each of Unexamined Japanese Patent Publication No. TokkaiHei 8-110949, No. TokkaiHei 8-161491, No. TokkaiHei 9-274656, and No. Tokkai201-266133 (P2001-266133A).

However, propriety regarding to the input of the fingerprint depends on not only the physical relationship between the finger of the user and the fingerprint sensor but also other things. For example, it is necessary to consider (1): whether outside light unrelated to a light source(s) for the fingerprint sensor exceeds tolerance level or not; and (2): whether an object put on the fingerprint sensor has characteristics suitable for being input or not.

The fingerprint authentication device uses minutiae, such as endpoints and branch points of ridges of the fingerprint image. Accordingly, the fingerprint authentication device tends to mistake 1): when the outside light unrelated to the light source(s) for the fingerprint sensor exceeds the tolerance level; (2): when the object put on the fingerprint sensor does not have the characteristics suitable for being input; and/or (3): when the object is properly put on the fingerprint sensor. Accordingly, the fingerprint authentication device must judge whether the input fingerprint image is proper or not concerning the above mentioned (1), (2) and (3) to obtain a higher accuracy of authentication. If necessary, the fingerprint authentication device must reflect the result of judgment concerning the above mentioned (1), (2) and (3) on the authentication. Alternatively, the fingerprint authentication device must request the user to put the finger on the fingerprint sensor again according to the result of judgment concerning the above mentioned (1), (2) and (3).

To perform the judgment concerning the above mentioned (1), (2) and (3), the fingerprint authentication device is possible to include additional sensors. For instance, an optical power sensor, a conductive sensor and a pressure sensor can be used for the above mentioned (1), (2) and (3), respectively. That is, the optical power sensor can be used to detect background light. The conductive sensor can be used to detect electric resistance of the object put on the fingerprint sensor The pressure sensor can be used to detect pressure provided from the object on the fingerprint sensor. The fingerprint authentication device processes output signals from the additional sensors in parallel to process the input data from the fingerprint sensor. The fingerprint authentication device performs the authentication in a comprehensive manner using processing results of both the output signals from the additional sensors and the input data from the fingerprint sensor.

However, the method using additional sensors has problems that special hardware for the additional sensors is necessary thereby cost increases. Furthermore, the method needs a long time for performing the authentication thereby it lacks convenience.

SUMMARY OF THE INVENTION:

It is therefore an object of this invention to provide a fingerprint authentication method capable of judging whether input data is proper or not from various viewpoints by the use of software.

Another object of this invention is to provide a fingerprint authentication method capable of performing fingerprint authentication with high accuracy, at low cost, and at low overhead (or in a short time).

Other objects of this invention will become clear as the description proceeds.

According to a first aspect of this invention, a fingerprint authentication method comprises a first step of collating features of input data based on a fingerprint input by an user with features of enrolled data; a second step of judging whether the input data are proper for authentication or not; and a third step of authenticating the input data according to results of the first step and the second step; wherein the second step is done by the use of a spatial frequency analysis of an input image represented by the input data.

For the fingerprint authentication method, the second step comprises a fourth step of deciding a rectangular observation area on the input image; a fifth step of finding Fourier transformed image from the input image; a sixth step of calculating discriminative values or feature values on the basis of the Fourier transformed image, the discriminative values representing features of the spatial frequency distribution of brightness of the input image; and a seventh step of deciding whether the input data are proper for the authentication or not on the basis of the discriminative values.

According to a second aspect of this invention, a computer readable program makes a computer system serve as a finger authentication device. The computer readable program comprises a first step of collating features of input data based on a fingerprint input by an user with features of enrolled data; a second step of judging whether the input data are proper for authentication or not; and a third step of authenticating the input data according to results of the first step and the second step; wherein the second step is done by the use of a spatial frequency analysis of an input image represented by the input data.

For the computer readable program, the second step comprises a fourth step of deciding a rectangular observation area on the input image; a fifth step of finding Fourier transformed image from the input image; a sixth step of calculating discriminative values on the basis of the Fourier transformed image, the discriminative values representing features of the spatial frequency distribution of the brightness of the image; and a seventh step of deciding whether the input data are proper for the authentication or not on the basis of the discriminative values.

According to third aspect of this invention, a fingerprint authentication device comprises a collating portion for collating features of input data based on a fingerprint input by an user with features of enrolled data. A characteristic judging portion judges whether the input data are proper for authentication or not. An authenticating portion authenticates the input data according to outputs from the collation portion and the characteristic judging portion. The characteristic judging portion uses a spatial frequency analysis of an input image represented by the input data to judge whether the input data are proper for authentication or not.

In the fingerprint authentication device, the characteristic judging portion comprises an observation area deciding portion for deciding a observation area on the input image. A frequency analyzing portion transforms image of the observation area into a Fourier transformed image. A discrimative value calculating portion calculates discriminative values on the basis of the Fourier transformed image. The discriminative values represent features of the spatial distribution of brightness. A deciding portion decides whether the input data are proper for the authentication or not on the basis of the discriminative values.

DESCRIPTION OF THE PREFERRED EMBODIMENT

Referring to FIGS. 1 to 5, description will be made about a fingerprint authentication device according to a first embodiment of this invention.

Figure 1:
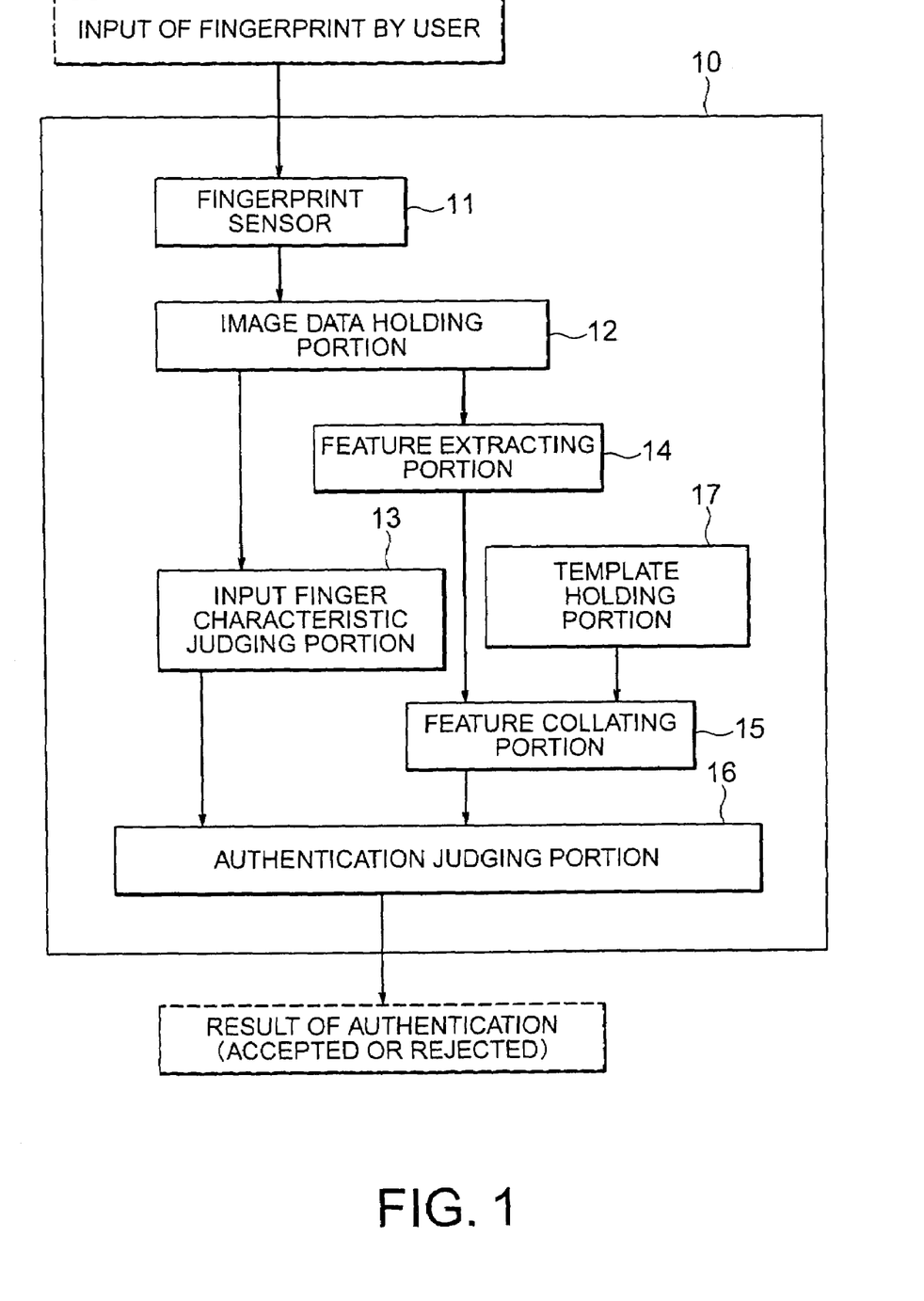
FIG. 1 is a block diagram of a fingerprint authentication device according to a first embodiment of this invention.

In FIG. 1, the fingerprint authentication device 10 comprises a fingerprint sensor 11, a image data holding portion 12, an input finger characteristic judging portion 13, a feature extracting portion 14, a feature collating portion 15, an authentication judging portion 16, and a template holding portion 17.

The fingerprint sensor 11 picks up an image of an object put thereon to produce digital image data. When a user puts her/his finger on the fingerprint sensor 11, the fingerprint sensor 11 picks up a fingerprint image of the finger and changes the fingerprint image into the digital image data representing the fingerprint image. For instance, the fingerprint sensor 11 comprises an optical system including a prism. In the optical system, light emitted by an LED is applied to an inner side of a reflecting surface of the prism. Reflected light reflected at the reflecting surface travels to a CCD. When the finger is put on an outer side of the reflecting surface, areas which are in contact with ridges of the fingerprint are different from other areas which corresponds to grooves of the fingerprint are different from each other in reflectance. Accordingly, the fingerprint image is picked up by the CCD.

Alternatively, the fingerprint sensor 11 may adopt the technique disclosed in the above mentioned Japanese Patent Publication No. 3150126 (P3150126). The disclosure thereof is incorporated herein by reference. In the technique, large number of photo acceptance units are arrayed in two dimensions and have acceptance surfaces covered with a common transparent cover. When the finger is located on the cover and applied with light from the outside, the light is diffusely reflected at the inside of the finger and a part of the light travels toward the acceptance units. Ridges of the fingerprint are in contact with the cover and allow the diffusely reflected light to go in the cover. On the other hand, grooves of the fingerprint are apart from the cover and make nothing for introducing the diffusely reflected light into the cover. That is, most of the diffusely reflected light which goes out from the grooves goes in the ridges or is reflected by the cover. Accordingly, each of the photo acceptance units detects a bright area as a part of the ridges and a dark area as a part of the grooves. Thus, the photo acceptance units can produce the digital image data representing the fingerprint. The digital image data represents brightness values (or pixel values) of two-dimensional arrangement corresponding to two-dimensional pixels (i.e. the photo acceptance units).

The digital image data is supplied from the fingerprint sensor 11 to the image data holding portion 12. The image data holding portion 12 holds or memorizes the digital image data.

The input finger characteristic judging portion 13 uses the digital image data held by the image data holding portion 12 to perform predetermined judgement regarding to input finger characteristics as mentioned later. Briefly, the input finger characteristic judging portion 13 produces a characteristic value on the basis of the digital image data and judges whether the characteristic value is within a predetermined range or not. The input finger characteristic judging portion 13 provides a judgement result signal to the authentication judging portion 16.

The feature extracting portion 14 extracts features for fingerprint collation in the feature collating portion 15 from the digital image data read out from the image data holding portion 12.

The template holding portion 17 holds or memorizes enrolled data. The enrolled data represents features which are previously extracted from digital image data provided from a normal or regular user(s).

The feature collating portion 15 calculates degree of similarity between the features extracted by the feature extracting portion 14 and the features represented by the enrolled data of the template holding portion 17. In other words, the feature collating portion 15 produces similarity degree between the fingerprint represented by the digital input image data and the fingerprint represented by the enrolled data.

The feature extracting portion 14 and the feature collating portion 15 may adopt techniques disclosed in the above mentioned Unexamined Japanese Patent Publication No. Hei 4-33065 or in Unexamined Japanese Patent Publication No. Tokkaisyo 56-24675. The disclosures of those are incorporated herein by reference. These techniques use a position (X, Y) of each minutiae (i.e. endpoints or branch points of ridges) in predetermined X-Y coordinates, a direction D of the ridge at the position, and relation numbers. Each of the relation numbers represents the number of ridges between the focused minutia and the nearest minutia nearest from the focused minutia in each of sectors surrounding the focused minutia. For instance, the sectors corresponds quadrants in a local X-Y coordinates which is different from the predetermined X-Y coordinates and has a origin corresponding to the position of the focused minutia. The techniques can stably collate fingerprints with high accuracy by the use of the above mentioned features.

The authentication judging portion 16 receives the judgement result signal from the input finger characteristic judging portion 13 and the similarity degree from the feature collating portion 15. The authentication judging portion 16 judges whether the judgment result shows that the digital image data is proper or not. Furthermore, the authentication judging portion 16 judges whether the similarity degree is more than or equal to a threshold value or not. When the similarity degree is more than or equal to the threshold value, the authentication judging portion 16 judges that the input digital image data is based on the same finger as the base of the enrolled data. Finally, the authentication judging portion 16 accepts the authentication request when the digital image data is proper and the similarity degree is more than or equal to the threshold value. If not so, the authentication judging portion 16 rejects the authentication request.

When the authentication judging portion 16 rejects the authentication request, it may request the user to put the finger on the fingerprint sensor 11 again with discarding the digital image data held in the image data holding portion 12.

Figure 2:
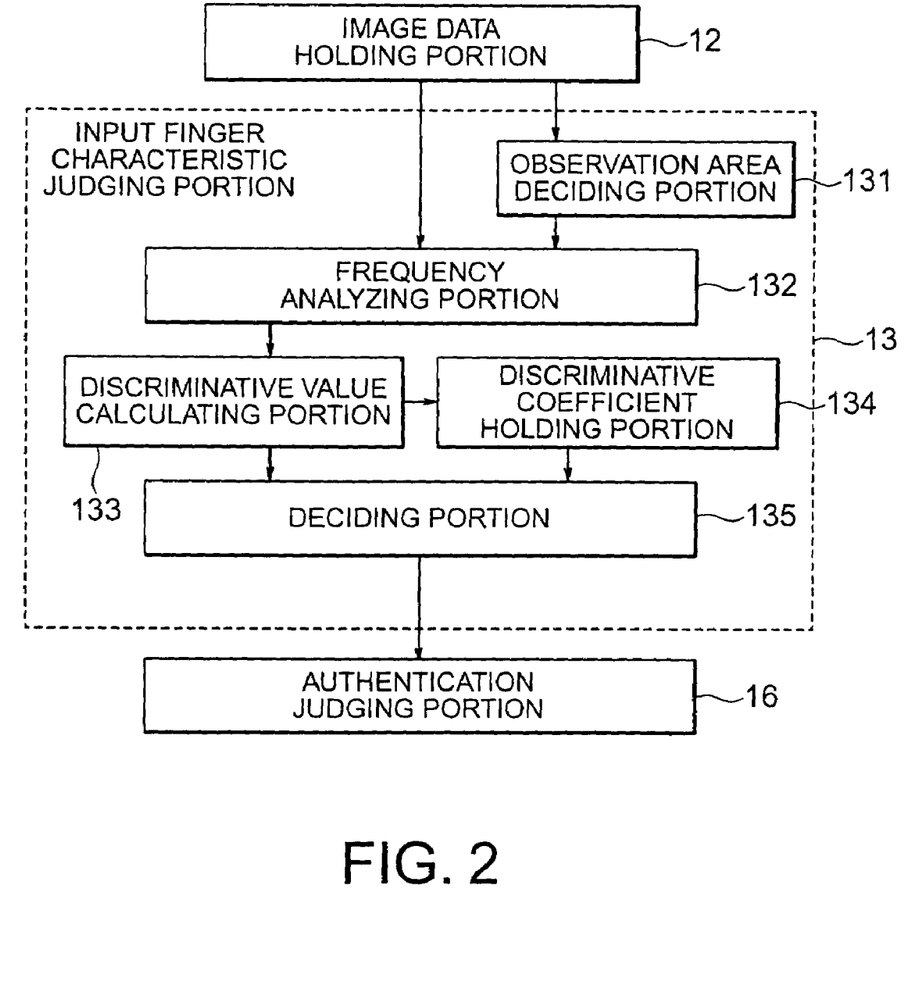
FIG. 2 is a block diagram of an input finger characteristic judging portion included in the fingerprint authentication device of FIG. 1.
Figure 3:
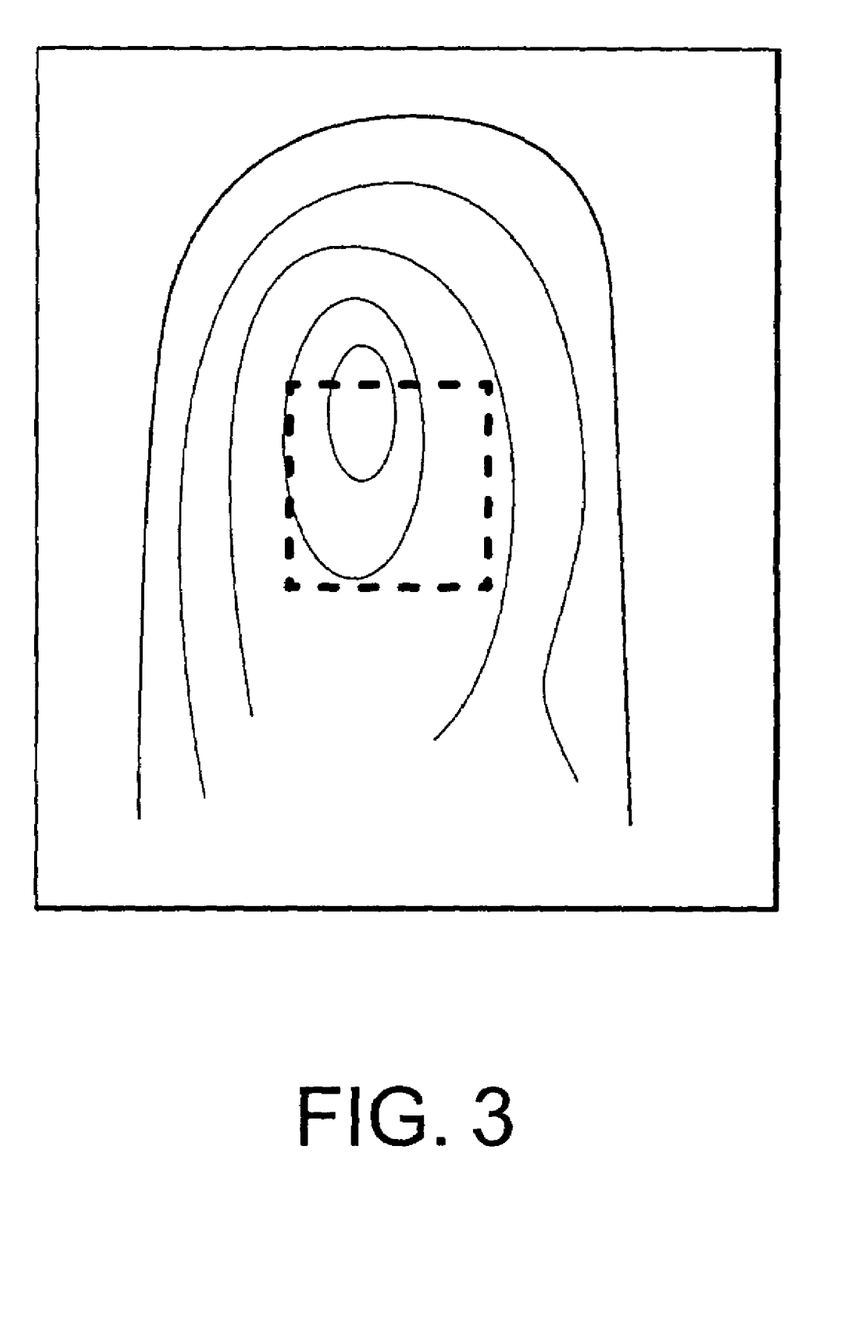
FIG. 3 is a schematic diagram for describing an observation area set on a fingerprint image by an observation area deciding portion included in the input finger characteristic judging portion of FIG. 2.

Referring to FIGS. 2 and 3, the input finger characteristic judging portion 13 will be described in more detail.

FIG. 2 shows an internal constitution of the input finger characteristic judging portion 13. As shown in FIG. 2, the input finger characteristic judging portion 13 comprises an observation area deciding portion 131, a frequency analyzing portion 132, a discriminative value calculating portion 133, a discriminative coefficient holding portion 134, and a deciding portion 135.

An operation of the input finger characteristic judging portion 13 will be described in below. Herein, the image data holding portion 12 holds the digital image data which represents the brightness values (or the pixel values) of the two dimensional arrangement corresponding to the two dimensional pixels as mentioned above. Each of the brightness values can take a value within a range from 0 to 255. Larger value of the brightness value signifies more bright while smaller value of the brightness value signifies more dark. That is, the larger value of the brightness value corresponds to the ridges of the fingerprint while the smaller value of the brightness value corresponds to the grooves of the fingerprint.

At first, the observation area deciding portion 131 decides a rectangular (or square) observation area to set it on the fingerprint image represented by the digital image data as illustrated in FIG. 3. The observation area has two pairs of sides. One of pairs is parallel to a Y direction identical to a fingertip or longitudinal direction of the finger put on the fingerprint sensor 11. The other is parallel to an X direction perpendicular to the Y direction. Each of the sides has a predetermined length within a range from a roughly tenth part to a roughly fourth part of an average finger width. The predetermined length is represented by power of 2. For example, when the fingerprint image has a size of 512 [pixels]×512[pixels], the predetermined length may be equal to 128.

The frequency analyzing portion 132 performs two-dimensional Fourier transform of apart of the digital image data corresponding to the observation area and performs a spatial frequency analysis. In general, the fingerprint image can be represented by a sum of periodical or plural sine curves. Therefore, the spatial frequency analysis explains that the image corresponding to the observation area can be resolved into sine curves having which directions and what frequencies (or pitches). Concretely, a Fourier transformed image is obtained by the Fourier transform of the image corresponding to the observation area. The Fourier transformed image represents a two-dimensional graph having the origin which is located at the center thereof and represents a direct-current component with nothing in frequency. In the Fourier transformed image, brightness at a coordinates (u, v) represents strength of a frequency component having a frequency u in the X direction and a frequency v in the Y direction.

Figure 4A:
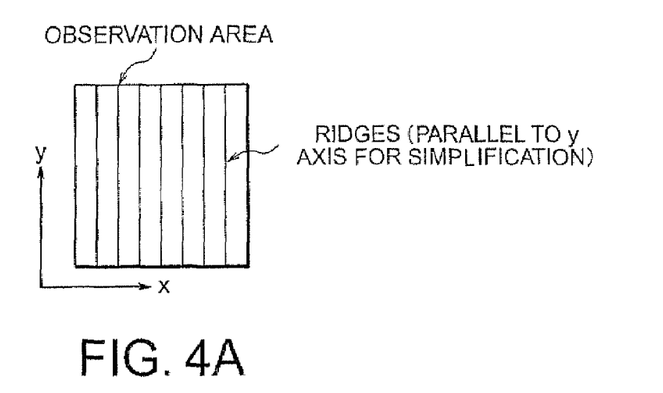
FIG. 4A shows a simplified image of the observation area of FIG. 3.
Figure 4B:
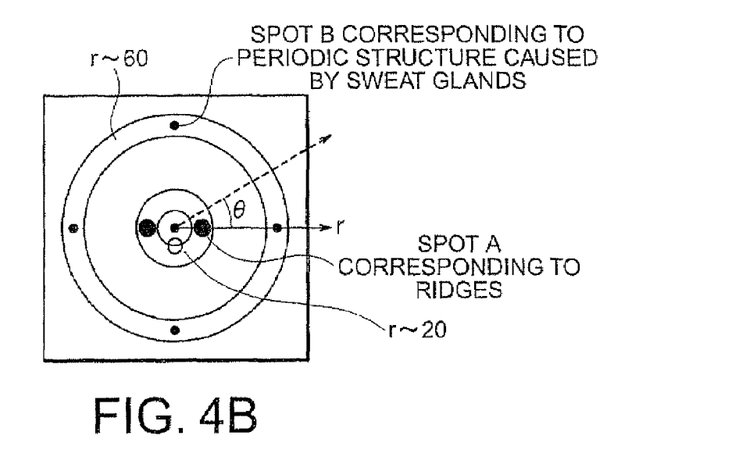
FIG. 4B shows a Fourier transformed image obtained from the image of FIG. 4A.

Referring FIGS. 4A and 4B, the spatial frequency analysis is described in more detail.

FIG. 4A is a schematic diagram of a real-space image of a fingerprint and corresponds to the observation area. Here, it is assumed that the real-space image has been obtained on an appropriate condition. Furthermore, for simplification, it is assumed that ridges represented by the real-space image are parallel to an y axis. Still furthermore, it is assumed that microscopic periodic structure which seems to be caused by sweat glands has periodic structure in x and/or y directions.

FIG. 4B shows a Fourier transformed image corresponding to the real-space image of FIG. 4A. In FIG. 4B, a center luminous spot (depicted by a black circle) represents a DC component. Luminous spots A lying in the vicinity of the center luminous spot correspond to a pitch (or interval or period) of the ridges of the real-space image. Luminous spots B lying at outer side correspond to a pitch (or interval or period) of the periodic structure caused by the sweat glands. It is known that these spots appear distinctly when the real-space image is input on an appropriate condition. These spots means that a pattern of the ridges and a pattern of the periodic structure caused by the sweat glands are approximate to sine curves. The input finger characteristic judging portion 13 uses features related to the two kinds of the luminous spots.

The discrimative value calculating portion 133 operates as follows by the use of the Fourier transformed image supplied from the frequency analyzing portion 132.

At first, the discriminative value calculating portion 133 calculates an average of values representing strength of frequency components corresponding to a circle assumed on the Fourier transformed image. The average $\overline{F(r)}$ is given by:

$$\overline{F(r)} = \frac{1}{2\pi r} \oint F(r, \theta) \, d\theta,$$

where r: a radius of the circle (arbitrary unit); θ: a displacement angle; and F(r,θ): the strength at a point of (r, θ) of the Fourier transformed image. The circle may be referred to as a spatial frequency band.

The discriminative value calculating portion 133 further calculates dispersion of the strength values corresponding to the circle. The dispersion $\sigma_F^2(r)$ is given by:

$$\sigma_F^2(r) = \frac{1}{2\pi r} \oint \left( F(r, \theta) - \overline{F(r)} \right)^2 d\theta.$$

The average and the dispersion are calculated for various radiuses within a range from 0 to the maximum. That is, a plurality of combinations of the average and the dispersion is calculated for predetermined spatial frequency bands. It is unnecessary that the predetermined spatial frequency bands cover the whole of the Fourier transformed image as mentioned later. However, graphs illustrated in FIG. 5 are obtained when it is supposed that only one predetermined spatial frequency band is cover the whole of the Fourier transformed image.

Figure 5:
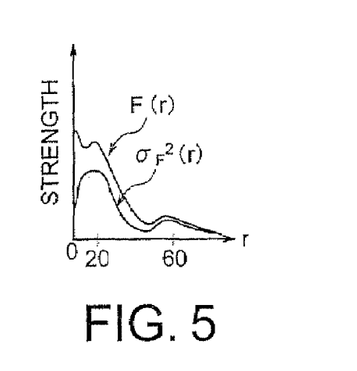
FIG. 5 shows graphs of average and dispersion of strength values against radiuses of circles assumed on the Fourier transformed image of FIG. 4B.

FIG. 5 shows the graphs of the average and the dispersion against the radiuses of the circles on the Fourier transformed image. As understood from FIGS. 4B and 5, the graphs have local maximums corresponding to the luminous spots A and B. Accordingly, it is desirable that one of the predetermined spatial frequency bands includes a spatial frequency corresponding to each luminous spot A while another one of the predetermined spatial frequency bands includes a spatial frequency corresponding to each luminous spot B. That is, one of the predetermined spatial frequency bands must include a spatial frequency corresponding to a generic period of ridges of the human fingerprint. Another one of the predetermined spatial frequency bands must include a spatial frequency corresponding to a generic period of a periodic structure caused by sweat glands on the human finger.

Each of the predetermined spatial frequency bands is included in any one of circular bands defined by the use of the radius r. For example, a circular band (p, q) includes a spatial frequency band having the radius of p at the most inner side and another spatial frequency band having the radius of q at the most outer side. Specifically, a circular band (5,10) represents a doughnut-shaped area defined by a smallest circle having the radius of 5 and a largest circle having the radius of 10 in the Fourier transformed image (see FIG. 4).

Next, the discriminative value calculating portion 133 calculates an average (referring to as a G value) of the strength values (or the average $\overline{F(r)}$) regarding the circular band (p, q). Furthermore, the discriminative value calculating portion 133 calculates an average (referring to as a H value) of the dispersion $\sigma_F^2(r)$ regarding the circular band (p,q). The G value corresponds to an average of brightness of the predetermined spatial frequency bands included in the circular band (p,q). The H value corresponds to dispersion of brightness of the predetermined spatial frequency bands included in the circular band (p,q). The G value G(p,q) and the H value B(p,q) are given by:

$$G(p, q) = \frac{1}{q-p}\int_p^q \overline{F(r)} dr, \text{ and}$$

$$H(p, q) = \frac{1}{q-p}\int_p^q \sigma_F^2(r) dr, \text{ respectively.}$$

The G value is calculated for each of four circular bands. Similarly, the H value is calculated for each of four circular bands. In other words, the discriminative value calculating portion 133 calculates $G_1$, $G_2$, $G_3$, $G_4$, $H_1$, $H_2$, $H_3$, and $H_4$. The circular bands for the G value may be entirely or partially coincide with the circular bands for the H value. For example, the discriminative value calculating portion 133 calculates $G_1$=G(5,10), $G_2$=G(15,25), $G_3$=G(45,55) $G_4$=G(55,65), $H_1$=H(5,15), $H_2$=H(30,45), $H_3$=H(45,55) and $H_4$=H(55,65) when it is assumed that each of the luminous spots A is at a distant of about 20 from the center and that each of the luminous spots B is at a distant of about 60 from the center.

The discriminative value calculating portion 133 further calculates discriminative values $X_1$, $X_2$, $X_3$, $X_4$ and $X_5$ which are given by:

$X_1 = G_1/G_2$;
$X_2 = G_4 - G_3$;
$X_3 = H_4 - H_3$;
$X_4 = H_1/H_3$; and
$X_5 = H_2 - H_1$.

The values of $H_4$ and $G_4$ are sensitive to the luminous spots B as understood from the above mentioned example (i.e. $G_4$=G(55,65) and $H_4$=H(55,65) when a distance between each spot B and the center is equal to about 60.). Accordingly, the discriminative values $X_2$ and $X_3$ are sensitive to the luminous spots B. On the other hand, the discriminative values $X_1$, $X_4$ and $X_5$ are sensitive to the luminous spots A. Therefore, the discriminative values can use to judge whether the fingerprint image is proper for the authentication or not or whether the fingerprint image is picked up on a appropriate condition or not. The discriminative values are provided to the deciding portion 135.

The deciding portion 135 calculates the characteristic value by the use of the discriminative values $X_1$, $X_2$, $X_3$, $X_4$ and $X_5$ and discriminative coefficients $b_0$, $b_1$, $b_2$, $b_3$, $b_4$ and $b_5$ held by the discriminative coefficient holding portion 134.

The discriminative coefficients $b_0$-$b_5$ are previously produced by the discriminative value calculation portion 133 on a learning phase before the discriminating phase mentioned above.

On the learning phase, digital image data of a large number of fingerprints are used as learning data sets. The learning data sets are classified into two groups. A first group of the learning data sets is obtained under the proper condition while a second group of the learning data sets is obtained under the improper condition. The proper condition is that (1) change of external environment, which includes outer light different from light for the fingerprint sensor 11, is very small; (2) the object located on the fingerprint sensor 11 has characteristics suitable for being input; and (3) the object has appropriate physical relationship with the fingerprint sensor 11.

The discriminative value calculation portion 133 calculates the discriminative values $X_1$, $X_2$, $X_3$, $X_4$ and $X_5$ for each of the learning data sets in the same way as mentioned above. Furthermore, the discriminative value calculation portion 133 calculates the discriminative coefficients $b_0$, $b_1$, $b_2$, $b_3$, $b_4$ and $b_5$. That is, the discriminative value calculation portion 133 performs multiple linear regression analysis using a regression equality of:

$$y = b_0 + b_1 X_1 + \ldots + b_5 X_5.$$

Here, target variables of 1 (y=1) and −1 (y=−1) are given for the first group and the second group of the learning data sets, respectively. Thus, the discriminative value calculation portion 133 calculates the discriminative coefficients $b_0$, $b_1$, $b_2$, $b_3$, $b_4$ and $b_5$ and provides them for the discriminative coefficient holding portion 134.

The discriminative coefficient holding portion 134 holds the discriminative coefficients $b_0$, $b_1$, $b_2$, $b_3$, $b_4$ and $b_5$.

On the discriminating phase, the deciding portion 135 calculates y of the above mentioned regression equality as the characteristic value. When the characteristic value is within the predetermined range, the deciding portion 135 judges that the digital image data is proper. On the other hand, when the characteristic value is out of the predetermined range, the deciding portion 135 judges that the digital image data is improper. For instance, the digital image data is proper when the characteristic value is positive while it is improper when the characteristic value is negative.

The deciding portion 135 provides the judgment result signal representing that the digital image data is proper or improper. The authentication judging portion 16 executes the authentication operation using the collation result (or the similarity degree) from the feature collating portion 15 when the judgement result represents that the digital image data is proper. The authentication judging portion 16 accepts the authentication request when the similarity degree is more than or equal to the threshold value. On the other hand, the authentication judging portion 16 does not execute the authentication operation using the collation result when the judgement result represents that the digital image data is improper. The authentication judging portion 16 rejects the authentication request.

Though the learning data sets are classified into two groups in the above description, the learning data sets may be classified into nix groups. That is, the learning data sets are classified into two groups according to each of the above mentioned conditions (1), (2) and (3).

In this case, first and second groups classified according to the above mentioned condition (1) are used to calculate a first set of discriminative coefficients $b_0^{(1)}$, $b_1^{(1)}$, $b_2^{(1)}$, $b_3^{(1)}$, $b_4^{(1)}$ and $b_5^{(1)}$. Third and fourth groups classified according to the above mentioned condition (2) are used to calculate a second set of discriminative coefficients $b_0^{(2)}$, $b_1^{(2)}$, $b_2^{(2)}$, $b_3^{(2)}$, $b_4^{(2)}$ and $b_5^{(2)}$. Fifth and sixes groups classified according to the above mentioned condition (3) are used to calculate a third set of discriminative coefficients $b_0^{(3)}$, $b_1^{(3)}$, $b_2^{(3)}$, $b_3^{(3)}$, $b_4^{(3)}$ and $b_5^{(3)}$.

To find the discriminative coefficients $b_0^{(1)}$-$b_5^{(1)}$, at first, the discriminative values $X_1$, $X_2$, $X_3$, $X_4$ and $X_5$ are calculated for each of the learning data sets of the first and the second groups. Next, the target variable 1 and −1 are given for the first the second groups, respectively, while the multiple linear regression analysis is carried out by the use of a regression equality of:

$$y^{(1)} = b_0^{(1)} + b_1^{(1)} X_1 + \ldots + b_5^{(1)} X_5.$$

Similarly, the discriminative coefficients $b_0^{(2)}$-$b_5^{(2)}$ and $b_0^{(3)}$-$b_5^{(3)}$ are calculated by the use of the following regression equalities.

$$y^{(2)} = b_0^{(2)} + b_1^{(2)} X_1 + \ldots + b_5^{(2)} X_5.$$

$$y^{(3)} = b_0^{(3)} + b_1^{(3)} X_1 + \ldots + b_5^{(3)} X_5.$$

On the discriminating phase, the digital input image data for the authentication are used to calculate the discriminative values $X_1$, $X_2$, $X_3$, $X_4$ and $X_5$. Furthermore, preliminary characteristic values of $y^{(1)}$, $y^{(2)}$ and $y^{(3)}$ are calculated by the use of the discriminative values $X_1$-$X_5$ and the discriminative coefficients $b_0^{(1)}$-$b_5^{(1)}$, $b_0^{(2)}$-$b_5^{(2)}$ and $b_0^{(3)}$-$b_5^{(3)}$. If all of the preliminary characteristic values $y^{(1)}$, $y^{(2)}$ and $y^{(3)}$ are within the predetermined range (e.g. positive), the digital input image data can be regarded as being picked up appropriately. Accordingly, the minimum of the preliminary characteristic values $y^{(1)}$, $y^{(2)}$ and $y^{(3)}$ is selected as the eventual characteristic value in this case. That is, the deciding portion 135 of the input finger characteristic judging portion 13 judges whether the digital image data is proper or not on the basis of the eventual characteristic value.

Figure 6:
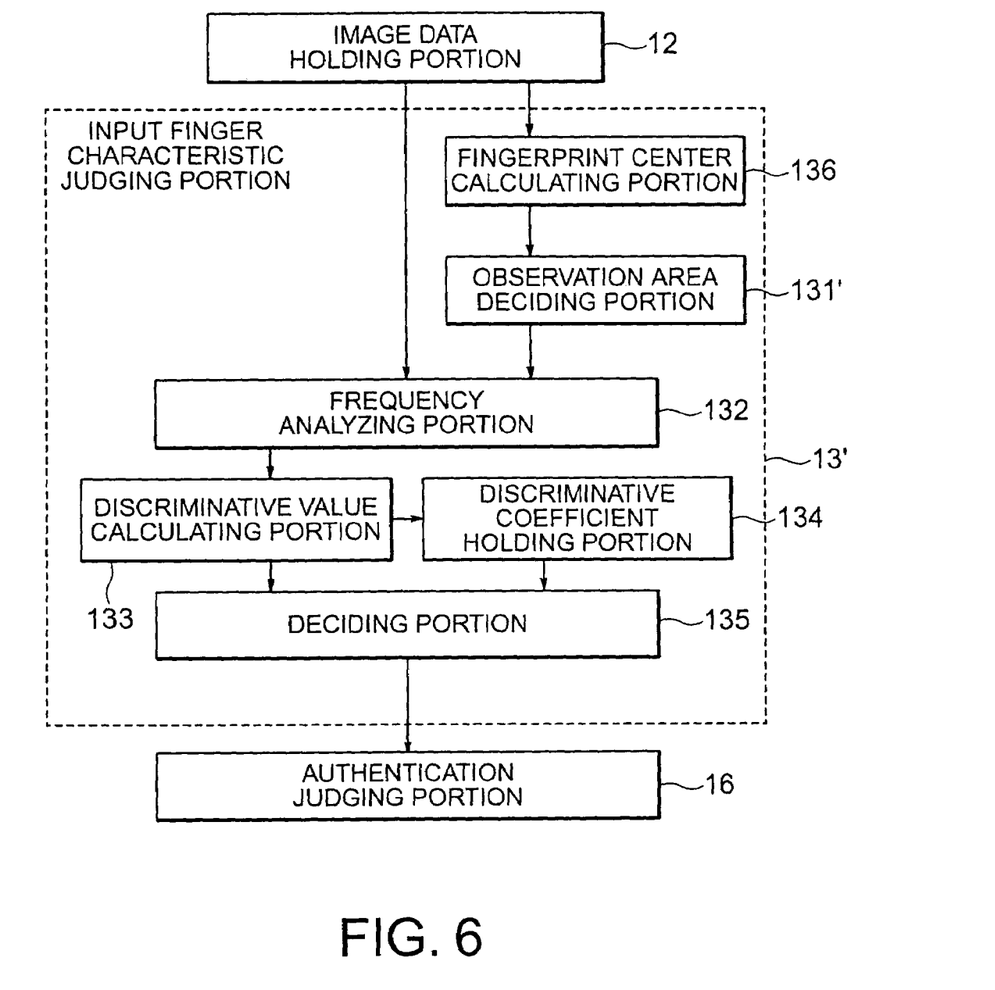
FIG. 6 is a block diagram of an input finger characteristic judging portion according to a second embodiment of this invention.
Figure 7:
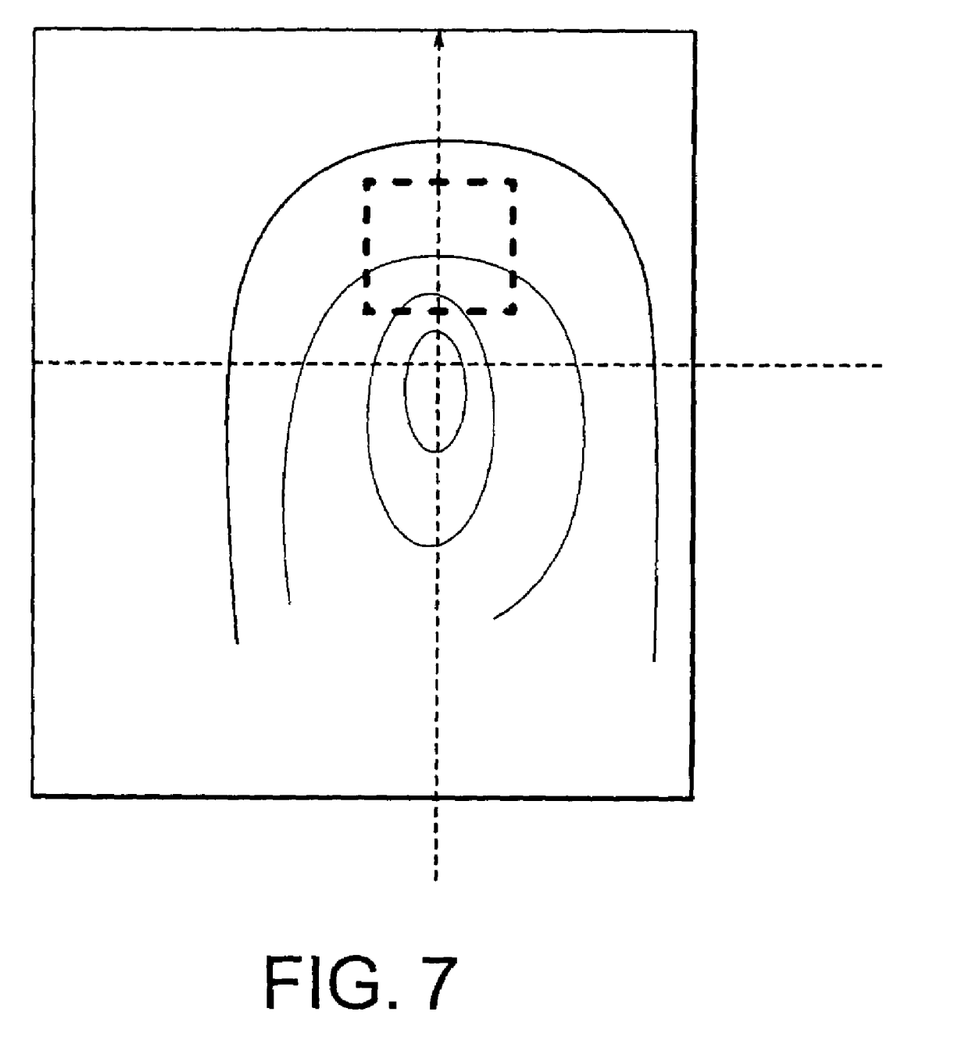
FIG. 7 is a schematic diagram for describing an observation area set on a fingerprint image by an observation area deciding portion included in the input finger characteristic judging portion of FIG. 6.

Referring to FIGS. 6 and 7, the description will proceed to an input finger characteristic judging portion 13' according to a second embodiment of this invention.

As illustrated in FIG. 6, the input finger characteristic judging portion 13' comprises a fingerprint center calculating portion 136 in addition to the structure of the input finger characteristic judging portion 13 shown in FIG. 2. The observation area deciding portion 131' is different from the observation area deciding portion 131 of FIG. 2 in operation. The input finger characteristic judging portion 13' is used in the fingerprint authentication device of FIG. 1 as a substitute for the input finger characteristic judging portion 13.

The fingerprint center calculating portion 136 finds a fingerprint center and a fingertip direction on the basis of the digital image data held in the image data holding portion 12. The fingerprint center is referred to as a core. The fingertip direction points in a direction of a fingertip of a fingerprint image represented by the digital image data (or two dimensional array data) held in the image data holding portion 12.

The fingerprint center can be found by the means of known manner. The fingertip direction can be found by, for example, a technique described in Japanese Patent Publication No. 2776757. The disclosure thereof is incorporated herein by reference. In this technique, it is assumed that radial vectors and ridge vectors have a unit length. The radial vectors are radially oriented from the fingerprint center and located apart from the fingerprint center. In addition, the radial vectors are located at predetermined (e.g. regular) intervals in the peripheral direction. Each of the ridge vectors has an initial point in common with any one of the radial vectors. Each of the ridge vectors is parallel to a ridge direction at the initial point. The ridge direction can be found by the means of know manner. Inner products of the radial vectors and the ridge vectors are calculated. A sequence of the inner products in an order according to the peripheral direction has a pattern. The fingertip direction can be decided by comparing the pattern with a pattern dictionary which is previously constructed. This is because the ridge direction and the radial direction are collated. If a certain radial vector is parallel to the fingertip direction, an inner product with regard to the radial vector is the minimum (or local minimum) value.

The observation area deciding portion 131' decides a observation area which is apart from the fingerprint center in the fingertip direction as shown in FIG. 7. For example, a distance between the center of the observation area and the fingerprint center is equal to 0.75×L, when the observation area has sides of a length of L.

The frequency analyzing portion 132 executes the frequency analysis for the observation area decided by the observation area deciding portion 131' in the same manner as the first embodiment.

After that, the input finger characteristic judging portion 13' operates like that of FIG. 2.

In above mentioned embodiments, like the feature extracting portion 14, the feature collating portion 15 and authentication judging portion 16, the input finger characteristic judging portion 13 (13') is provided as a form of a computer program (or software). In other words, the input finger characteristic judging portion 13 (13') is substantiated by execution of the computer program in a computer system. The computer system serves as the fingerprint authentication device 10.

According to the abovementioned embodiments, it is carried out by software processing (1) whether change of external environment, which includes outer light different from light for the fingerprint sensor 11, is smaller than the maximum permissible level or not; (2) whether the object located on the fingerprint sensor 11 has characteristics suitable for being input or not; and (3) whether the object has appropriate physical relationship with the fingerprint sensor 11 or not. Thus, it is unnecessary to provide special hardware for the above mentioned judgements. Therefore, the fingerprint authentication device has two advantages of high accuracy of fingerprint authentication and low cost.

Furthermore, the fingerprint authentication device uses a small observation area to carry out the above mentioned judgements. Thus, a small amount of calculation is necessary for the above mentioned judgements in comparison with a case where all of the digital image data are used. Therefore, it is unnecessary to enhance throughput of the fingerprint authentication device. In other words, processing time required for the fingerprint authentication is hardly increased by the above mentioned judgements.

In particularly, according to the second embodiment, the input finger characteristic judging portion 13' can judges whether the digital image data is proper or not with higher accuracy. This is because ridges are generally perpendicular to the fingertip direction between the fingerprint center and the fingertip. In other words, sine curves formed by the ridges are concentrated between the fingerprint center and the fingertip.

While this invention has thus far been described in conjunction with the few embodiments thereof, it will readily be possible for those skilled in the art to put this invention into practice in various other manners.

For example, the input finger characteristic judging portion 13 (or 13') may provide the characteristic value to the authentication judging portion 16. In this case, the judging whether the fingerprint is proper or not is executed by the authentication judging portion 16.

What is claimed is:

1. A fingerprint authentication method comprising:
a first step of collating features of input data based on a fingerprint input by a user with features of enrolled data;

a second step of judging whether the input data are proper for authentication or not, said second step using a spatial frequency analysis of an input image represented by the input data; and a third step of authenticating the input data according to results of said first step and said second step; wherein said second step comprises:

a fourth step of deciding a rectangular observation area on the input image;

a fifth step of finding a Fourier transformed image from the input image;

a sixth step of calculating feature values on the basis of plural frequency bands derived from the Fourier transformed image, said feature values representing features of the spatial frequency distribution of brightness of the input image; and a seventh step of deciding whether the input data are proper for the authentication or not on the basis of the feature values, wherein said sixth step is done by the use of variance of strength values corresponding to two predetermined spatial frequency bands in the Fourier transformed image.

2. A fingerprint authentication method as claimed in claim 1, wherein said seventh step is done by the use of one or more discriminant functions and corresponding discriminative coefficients which are previously calculated by the use of the discriminant functions, the discriminant functions being for finding a characteristic value according to the feature values, and the characteristic value being used for deciding whether the input data are proper for the authentication or not.

3. A fingerprint authentication method as claimed in claims 1, or 2, wherein said predetermined spatial frequency bands includes two spatial frequencies corresponding to a generic period of ridges of a human fingerprint.

4. A fingerprint authentication method as claimed in claims 1, or 2, wherein said predetermined spatial frequency bands include two spatial frequencies corresponding to a generic period of a periodic structure caused by sweat glands of a human finger.

5. A computer readable program for making a computer system serve as a fingerprint authentication device, comprising:

a first step of collating features of input data based on a fingerprint input by a user with features of enrolled data;

a second step of judging whether the input data are proper for authentication or not, said second step using a spatial frequency analysis of an input image represented by the input data; and a third step of authenticating the input data according to results of said first step and said second step; wherein said second step comprises:

a fourth step of deciding a rectangular observation area on the input image;

a fifth step of finding a Fourier transformed image from the input image;

a sixth step of calculating feature values on the basis of plural frequency bands derived from the Fourier transformed image, said feature values representing features of the spatial frequency distribution of the brightness of the input image; and a seventh step of deciding whether the input data are proper for the authentication or not on the basis of the feature values, wherein said sixth step is done by the use of variance of strength values corresponding to two predetermined spatial frequency bands in the Fourier transformed image.

6. A computer readable program as claimed in claim 5, wherein said seventh step is done by the use of one or more discriminant functions and corresponding discriminative coefficients which are previously calculated by the use of the discriminant functions, the discriminant functions being for finding a characteristic value according to the feature values, and the characteristic value being used for deciding whether the input data are proper for the authentication or not.

7. A computer readable program as claimed in claims 5, or 6, wherein said predetermined spatial frequency bands include two spatial frequencies corresponding to a generic period of ridges of a human fingerprint.

8. A computer readable program as claimed in claims 5, or 6, wherein said predetermined spatial frequency bands includes two spatial frequencies corresponding to a generic period of a periodic structure caused by sweat glands of a human finger.

9. A fingerprint authentication device comprising:

a collating portion for collating features of input data based on a fingerprint input by a user with features of enrolled data;

a characteristic judging portion for judging whether the input data are proper for authentication or not, said characteristic judging portion uses a spatial frequency analysis of an input image represented by the input data to judge whether the input data are proper for authentication or not; and an authenticating judging portion for authenticating the input data according to outputs from said collation portion and said characteristic judging portion; wherein said characteristic judging portion comprises an observation area deciding portion for deciding an observation area on the input image;

a frequency analyzing portion for transforming an image of the observation area into a Fourier transformed image;

a feature value calculating portion for calculating feature values on the basis of plural frequency bands derived from the Fourier transformed image, said feature values representing features of the spatial frequency distribution of brightness of the input image; and a deciding portion for deciding whether the input data are proper for the authentication or not on the basis of the feature values, wherein said feature value calculating portion uses variance of strength values corresponding to two predetermined spatial bands in the Fourier transformed image.

10. A fingerprint authentication device as claimed in claim 9, further comprises a discriminative coefficient holding portion for holding one or more discriminant functions and corresponding discriminative coefficients which are previously calculated by the use of said discriminant functions, the discriminant functions being for finding a characteristic value according to the feature values, and the characteristic value being used for deciding whether the input data are proper for the authentication or not.

11. A fingerprint authentication device as claimed in claim 9, wherein said predetermined spatial frequency bands includes two spatial frequencies corresponding to a generic period of ridges of a human fingerprint.

12. A fingerprint authentication device as claimed in claims 9 or 10, wherein said predetermined spatial frequency bands include two spatial frequencies corresponding to a generic period of a periodic structure caused by sweat glands of a human finger.

13. A fingerprint authentication method as claimed in claims 1 or 2, wherein the discriminant function and the corresponding discriminative coefficients are decided by learning using learning data sets of fingerprints.

14. A fingerprint authentication method as claimed in claims 1, or 2, wherein the discriminant functions weight the feature values with the discriminative coefficients and add the weighted feature values to find the characteristic value.

15. A fingerprint authentication method as claimed in claims 1, or 2, wherein each of the feature values is a difference/ratio between/of values of the variance of the two predetermined spatial frequency bands.

16. A computer readable program as claimed in claims 5 or 6, wherein the discriminant functions and the corresponding discriminative coefficients are decided by learning using learning data sets of fingerprints.

17. A computer readable program as claimed in claims 5, or 6, wherein the discriminant functions weight the feature values with the discriminative coefficients and add the weighted feature values to find the characteristic value.

18. A computer readable program as claimed in claims 5, or 6, wherein each of the feature values is a difference/ratio between/of values of the variance of the two predetermined spatial frequency bands.

19. A fingerprint authentication device as claimed in claims 9 or 10, wherein the discriminant functions and the corresponding discriminative coefficients are decided by learning using learning data sets of fingerprints.

20. A fingerprint authentication device as claimed in claims 9, or 10, wherein the discriminant functions weight the feature values with the discriminative coefficients and add the weighted feature values to find the characteristic value.

21. A fingerprint authentication device as claimed in claims 9, or 10, wherein each of the feature values is a difference/ratio between/of values of the variance of the two predetermined spatial frequency bands.

* * * * *